Oct. 7, 1924.
R. W. CUDWORTH
ANIMAL TRAP
Filed Feb. 21, 1923
1,510,832
2 Sheets-Sheet 2
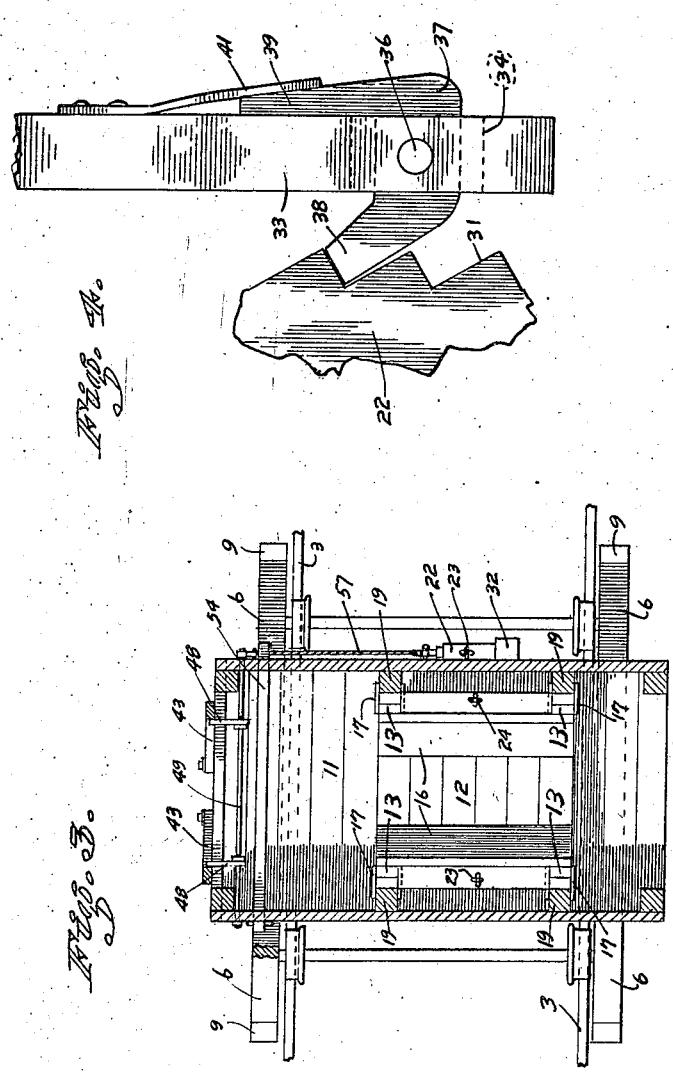
INVENTOR.
R.W. CUDWORTH
BY 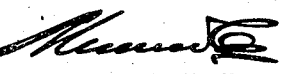
ATTORNEYS.

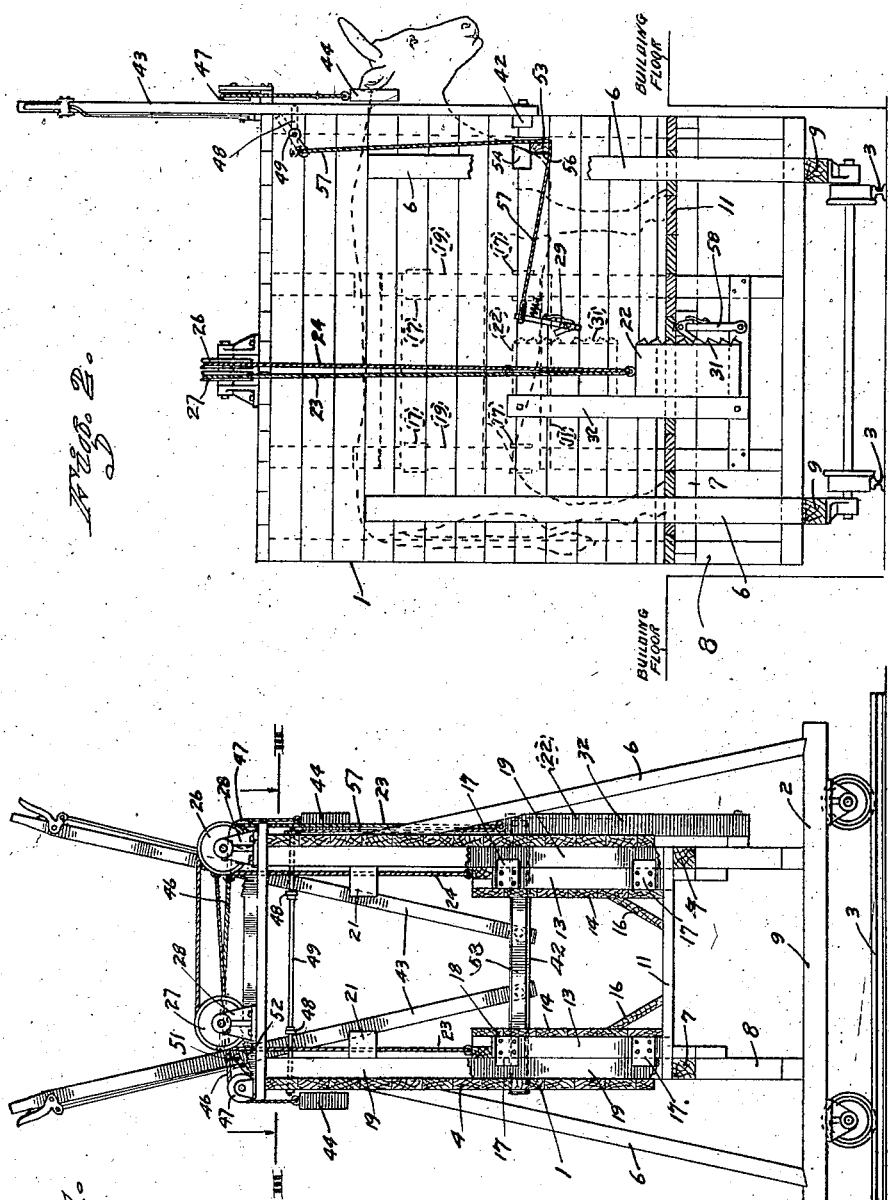

Patented Oct. 7, 1924.

1,510,832

UNITED STATES PATENT OFFICE.

ROYAL W. CUDWORTH, OF SAN FRANCISCO, CALIFORNIA.

ANIMAL TRAP.

Application filed February 21, 1923. Serial No. 620,448.

*To all whom it may concern:*

Be it known that I, ROYAL W. CUDWORTH, a citizen of the United States, and a resident of San Francisco, county of San Francisco, State of California, have invented a new and useful Animal Trap, of which the following is a specification.

The present invention relates to improvements in animal traps and is particularly designed to be used in slaughtering houses for the securing of animals to be killed. The particular object of the invention is to provide portable means allowing an animal as a steer for instance to be trapped without effort on the part of the operators and to be secured in a position where it cannot move and where its head is lifted clear of the trapping device so that the means for killing the animal may be readily applied. Further objects and advantages of the device will appear as the specification proceeds.

The preferred form of the invention is illustrated in the accompanying drawings in which Figure 1 shows a vertical rear view of my device with the sliding body trap or trough in lowered position ready to be sprung, Figure 2 a side elevation of the same with an animal trapped therein, Figure 3 a horizontal section taken along line 111—111 of Figure 1 and Figure 4 an enlarged detail view showing a catch used in connection with my device. While I have shown only the preferred form of the invention it should be understood that various changes or modifications may be made within the scope of the claims hereto attached without departing from the spirit of the invention.

My trap (1) is mounted on a truck (2) adapted to travel on rails (3) and comprises a cage (4) disposed transversely to the travelling direction of the truck and held in place by means of suitable braces (6). The cage is supported on cross members (7) of frames (8) resting on the body (9) of the truck. The rails (3) are arranged in such a manner relative to the general floor that the truck operates below the floor level and the floor (11) of the cage is flush with the floor of the building in which the animals to be slaughtered are confined.

The cage itself is a rectangular box as shown in the drawing of sufficient width and height to allow the animal to be trapped when passing therethrough. The front and rear ends of the cage are open and the rear end connects with the room in which the animals to be killed are kept while the front end preferably opens upon a stack of hay or a similar bait for the animals.

A central portion (12) of the floor corresponding in length substantially to the distance between the front and hind legs of the animal to be trapped is detached from the balance of the floor and mounted with freedom of vertical sliding motion in the following manner. From the four corners of this central portion, which latter is somewhat narrower than the width of the cage, rise four upright members (13) each two of which are connected by means of boards (14) so as to form a trough adapted to fit around the body of the animal. Bracing members (16) may be introduced in the lower corners of this trough to make the same conform more closely to the shape of the animal's body. From each upright member (13) extend outwardly and in spaced relation with one another two plates (17) secured to the upright members by means of bolts (18) or in any other suitable manner. These plates which form a groove between the same are adapted to slidably engage stationary upright members (19) secured to the sides of the cage so that the trough may be slid upwardly within the cage until stopped by suitable projections (21) extending inwardly from the upright members (19).

Vertical motion is imparted to the trough by means of a heavy weight (22) disposed on the outside of the cage and connected to the two sides of the trough by means of two cables (23) and (24) passing over two pulleys (26) and (27) supported in brackets (28) disposed on the top of the cage. The weight is normally held in an uppermost position ready for action by means of a catch (29) shown in detail in Figure 4 engaging teeth (31) extending from the weight which latter is adapted to slide in a guide member (32). The catch comprises a bar (33) slotted as shown at (34) and pivotally supported on a stationary pin (36) extending through the slot and the yoke shaped member (37) pivoted on the pin (36) within the slot. One arm (38) of the yoke shaped member is adapted to engage any one of the teeth of the weight so as to hold the same against downward motion while the other arm (39) lies flat against one side of the bar (33) and is yieldingly held in that position by means of a spring (41). While this construction prevents the weight from moving downwardly relative to the catch it does not interfere with the upward motion of the weight.

At the front end of the cage is provided a transverse bar (42) to which are pivoted in operative relation to one another two vertical bars (43) adapted to form a stanchion for holding the neck of the animal. The two bars of the stanchion, the central portions of which ride in a slot in the top of the cage, are actuated by means of weights (44) which are connected to the bars by ropes (46) and which pass over pulleys (47). Normally the two bars of the stanchion are locked in an open position by two latches (48) pivoted to a transverse rod (49) and extending into the respective paths of the bars of the stanchion but when these latches are removed the weights draw the two bars (43) together so as to engage the neck of the animal and the bars are locked in their final position by means of pawls (51) engaging a ratchet (52) secured to the top member of the cage.

It will thus be seen that both the trough and the stanchion require the removal of the catch or the latch before they are rendered active and I propose to cause both of these acts to be performed simultaneously by the advancing animal. For this purpose I provide a beam (53) in the front end of the cage, the beam being supported in two registering horizontal slots (54) terminating in vertical slots (56). A rope (57) connecting the free end of the latch (48) with the free end of the catch (29) is guided around the beam (53). When the beam is in the rear portion of the two horizontal slots (54) the rope (57) is stretched taut but still allows both the latch (48) and the catch (29) to perform their function. When the animal advances it pushes against the horizontal beam (53) and pushes the same not only forward but also allows it to drop into the vertical slot (56). In going through this movement the beam exerts a pull on both ends of the rope and causes the catch (29) to be tripped so that the weight (22) may be dropped and simultaneously takes the latch (48) out of the paths of the two stanchion bars so as to allow the latter to close in on the animal.

The operation of the device should be clearly understood from the foregoing description. As the animal passes through the cage and arrives at a position in which its front legs and its hind legs are disposed on opposite sides of the trough, the front portion of its body will strike the beam (53) and force the same forwardly and downwardly whereby a pull is exerted on the two ends of the rope (57). The catch (29) is thereby disengaged from the weight (22) which is allowed to drop whereby the trough is raised between the legs of the animal so that it engages the body portion of the latter and exercises a lifting effect. It is not necessary for the purposes of this device that the animal be lifted clear off the floor, if only its body is lifted sufficiently high so that the legs although touching the floor are rendered ineffective. At the same time or immediately thereafter the latches (48) are removed from the path of the stanchion bars and the weights (44) close the latter which are held in the closed position by means of the pawls (51).

The weight (22) after having reached its lowermost position is held in said position by means of a second catch (58).

I claim:

1. A trap for animals of the character described comprising a cage allowing the animal to enter thereinto, said cage having a section of the floor and sides loose and arranged to move upwardly to engage the body of the animal between its fore and hind legs.

2. A trap for animals of the character described comprising a cage allowing the animal to enter thereinto and means associated with the cage adapted to engage the body of the animal between the fore and hind legs of the same for exercising a lifting effect, having means connected therewith for rendering the same active adapted to be actuated by the advancing animal.

3. A trap for animals of the character described comprising a cage allowing the animal to enter thereinto, said cage having a section of the floor and sides vertically slidable and adapted to engage the body of the animal between its fore and hind legs, a clamp for engaging opposite sides of the neck of the animal and automatic means for actuating the sliding floor and clamp.

4. A trap for animals of the character described comprising a cage allowing the animal to enter thereinto, means associated with the cage adapted to engage the body of the animal between the fore and hind legs of the same for exercising a lifting effect, means for engaging the neck of the animal from opposite sides for confining the same, and means for rendering both of said means active simultaneously adapted to be actuated by the advancing animal.

5. A trap for animals of the character described comprising a cage allowing the animal to enter thereinto having a central floor portion mounted with freedom of vertical motion and means for raising said floor portion for operative engagement with the body of the animal whereby a lifting effect in exercised.

6. A trap for animals of the character described comprising a cage allowing the animal to enter thereinto having a central floor portion mounted with freedom of vertical motion, a weight for raising said floor portion into operative engagement with the body of the animal whereby a lifting effect is exercised having a catch associated therewith for holding the same in an operative position and means actuated by the advancing animal for releasing the catch.

7. A trap for animals of the character described comprising a cage allowing the animal to enter thereinto having a central floor portion mounted with freedom of vertical motion, a weight for raising said floor portion into operative engagement with the body of the animal whereby a lifting effect is exercised having a catch associated therewith for holding the same in an operative position and a beam stretched across the front end of the cage having an operative engagement with the catch adapted to be actuated by the advancing animal for releasing the catch.

8. A trap for animals of the character described comprising a cage allowing the animal to enter thereinto having a central floor portion mounted with freedom of vertical motion, a weight for raising said floor portion into operative engagement with the body of the animal whereby a lifting effect is exercised, a vertical bar pivotally mounted in the front portion of the cage in operative relation to a second bar adapted to be swung into a neck confining position, and means adapted to be actuated by the advancing animal for simultaneously rendering the weight and the bar active.

9. A trap for animals of the character described comprising a cage allowing the animal to enter thereinto having a central floor portion mounted with freedom of vertical motion, a weight for raising said floor portion into operative engagement with the body of the animal whereby a lifting effect is exercised, having a catch associated therewith for holding the same in an operative position, a vertical bar pivotally mounted in the front portion of the cage in operative relation to a second bar having a weight associated therewith for swinging the same into a neck confining position with a catch for holding the same in an operative position, and a beam stretched across the front end of the cage operatively connected with both catches adapted to be actuated by the advancing animal for releasing the same.

ROYAL W. CUDWORTH.